G. H. HAWRICAN.
CURRY-COMB.
No. 183,302. Patented Oct. 17, 1876.
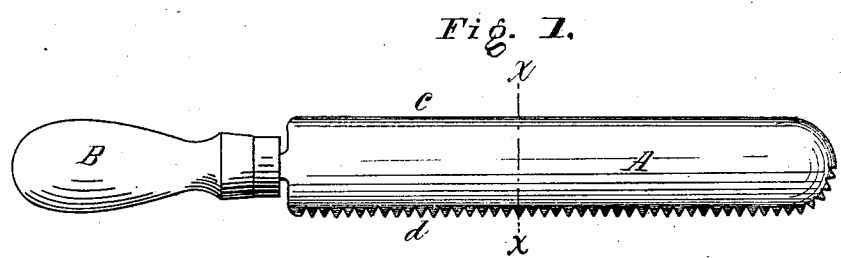
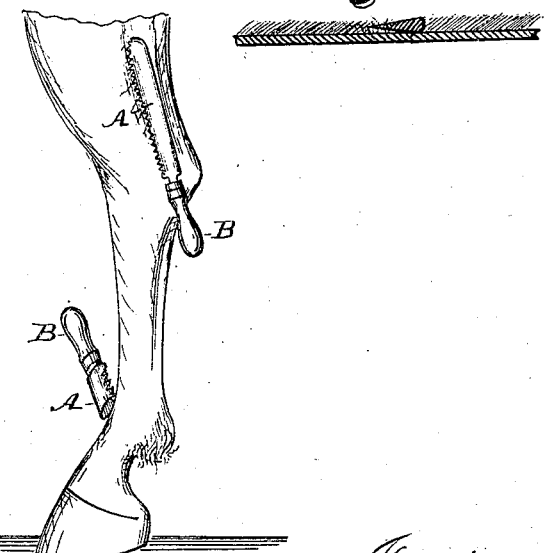
Witnesses:
Inventor:
Giles H. Hawrican,
Per C. C. Shaw,
Atty.

UNITED STATES PATENT OFFICE.

GILES H. HAWRICAN, OF NORTH HERO, VERMONT.

IMPROVEMENT IN CURRY-COMBS.

Specification forming part of Letters Patent No. 183,302, dated October 17, 1876; application filed April 22, 1876.

*To all whom it may concern:*

Be it known that I, GILES H. HAWRICAN, of North Hero, in the county of Grand Isle and State of Vermont, have invented a new and Improved Curry-Comb; and I do hereby declare that the following is a full, clear, and exact description of the same.

This invention is an improved implement for currying horses. It is formed of a straight blade, convexo-convex in cross-section, and provided on one side with beveled teeth, having their points adjusted in line, or in the plane of its minor axis.

This construction adapts the comb to be used equally well upon those parts of the body of the horse or other animal which are sinuous or angular as upon those which are smooth or gently rounded.

In the accompanying drawing, forming part of this specification, Figure 1 is a side view of the curry-comb. Fig. 2 is a cross-section on the line $x$. Figs. 3, 4, and 5 show the mode of practically applying the implement.

The straight blade A, having handle B, is made double convex in cross-section, and provided on one side with a series of teeth, $d$, which are beveled to conformity with the axis of the sides of the blade, so that their points lie in the plane of the minor axis of the blade. The rounded end of the blade is likewise beveled to a blunt edge, and serrated for half of its width, to enable the comb to be used more effectively in the cavities or hollows in the legs of the horses or other animal being curried.

The object of constructing the blade double convex is to adapt it for effective use both upon the smooth or gently-rounded portions of the animal's body, and upon the angular or sinuous portions. The latter application is illustrated in Fig. 3 of drawing, in which the blade A is shown in one instance applied vertically in the long cavity or depression immediately above the hock, and in the other instance, transversely, just above pastern, of the leg of a horse.

It is obvious that if the blade were wedge-shaped in cross-section it could not be thus effectively applied.

The convexity of the sides of the blade likewise enables it to be manipulated upon the smooth or flat surfaces of the animal's body in a manner which other forms would not admit of, since the blade may be rocked, as it were, upon its side, to bring the teeth $d$ into or out of contact with the skin. In other words, as the blade is swept over the surface to be curried the toothed edge $d$ may be elevated more or less, according to the length or condition of the hair, or the kind and amount of foreign matter embedded in or attached to the hair. This manipulation is easily effected without quickly tiring the hand and arm of the operator, as would be the case were the blade wedge-shaped or triangular in cross-section, for in the one instance the body of the blade rests against the surface being curried, while in the other only the back of the blade can rest on such surface. This will be more apparent by reference to Figs. 4 and 5.

The common curry-comb cannot be operated otherwise than upon the principle of the rake or harrow, and consequently causes annoyance, pain, and positive injury to fine-haired, sensitive animals, even in the hand of the most careful and gentle groom. It is also not adapted for currying or cleaning the sinuous and angular parts of the animal's body, and is especially tiresome to the operator.

My improved implement operates upon a different principle, being so constructed that the points of the teeth cannot scratch the skin of the animal, but will yet work under, scale off, and detach the particles of foreign matter adhering thereto.

The smooth beveled edge or back $c$ of the blade serves as a scraper for removing perspiration from the animal's skin.

What I claim is—

The improved curry-comb herein described, formed of the straight blade A, made convexo-convex in cross-section, and provided with teeth $d$, beveled on each side, and having their points in line, as shown and described.

GILES HARRINGTON HAWRICAN. [L. S.]

Witnesses:
 C. B. RUSSELL,
 J. M. HAWRICAN.